US008434516B2

(12) United States Patent
Aranovich

(10) Patent No.: US 8,434,516 B2
(45) Date of Patent: May 7, 2013

(54) THREE POSITION SOLENOID VALVE

(75) Inventor: Felix Efimovich Aranovich, Skokie, IL (US)

(73) Assignee: Parker-Hannifin Corporation, Cleveland, OH (US)

(*) Notice: Subject to any disclaimer, the term of this patent is extended or adjusted under 35 U.S.C. 154(b) by 1946 days.

(21) Appl. No.: 11/409,830

(22) Filed: Apr. 24, 2006

(65) Prior Publication Data

US 2007/0246112 A1 Oct. 25, 2007

(51) Int. Cl.
*F16K 31/06* (2006.01)
*F16K 11/07* (2006.01)
*F01L 3/10* (2006.01)

(52) U.S. Cl.
USPC .................. 137/625.67; 137/625.68; 251/337

(58) Field of Classification Search ............. 137/625.65, 137/625.68; 251/337
See application file for complete search history.

(56) References Cited

U.S. PATENT DOCUMENTS 3,762,442 A * 10/1973 Paul ........................... 137/625.2
5,117,869 A * 6/1992 Kolchinsky .............. 137/625.65

* cited by examiner

*Primary Examiner* — Craig Schneider
(74) *Attorney, Agent, or Firm* — Wood, Phillips, Katz, Clark & Mortimer

(57) ABSTRACT

A cartridge valve comprises an elongate housing defining an interior chamber. A port end of the chamber comprises an end port and a plurality of axially spaced side openings define first, second and third side ports. An axial opposite end comprises a sleeve end receivable in a solenoid, in use, and a spring chamber intermediate the port end and the sleeve end. A valve member is movable in the chamber at the port end between a neutral position and opposite first and second actuated positions for selectively controlling fluid flow between the end port and the side ports. A solenoid plunger is movable in the sleeve end of the interior chamber. First and second springs in the spring chamber effectively provide a bias force to the valve member for creating a non-symmetrical force pattern for push and pull movement of the valve member.

15 Claims, 7 Drawing Sheets

THREE POSITION SOLENOID VALVE

CROSS REFERENCE TO RELATED APPLICATIONS

There are no related applications.

FIELD OF THE INVENTION

This invention relates to control valves and, more particularly, to a three position solenoid operated valve adapted to match non-symmetrical external forces.

BACKGROUND OF THE INVENTION

In one form of a fluid pressure control valve, a flow control element, such as a spool or valve member, is movably positioned in a valve chamber for selectively fluidically coupling ports. The spool may be directly actuated by a movable armature or plunger. A solenoid controllably positions the plunger, which results in movement of the spool. Typically, a coil spring is used for biasing the spool to the neutral position.

One type of solenoid operated valve comprises a three position cartridge valve. A pair of solenoids, or a bi-directional solenoid, are selectively energized for positioning the valve member using a pull force or a push force between opposite actuated positions. Particularly, energization of the solenoid coil produces a force acting on the plunger to move the plunger in a direction toward the valve member, to provide a pushing action, or away from the valve member, to provide a pulling action. Such a valve may be used to operate double acting cylinders, in bi-directional motors, or the like.

With a four way valve, an elongate cylindrical valve housing has an axial through bore defining an interior chamber. A port end of the chamber comprises an end port. A plurality of axially spaced side openings define first, second and third side ports. The valve member selectively couples the end port and the side ports for selectively controlling fluid flow. In a typical application, the end port is connected to a tank. One of the side ports, typically the middle, is connected to a pressure source. The other side ports are connected to the controlled device. In the neutral position of the valve member, flow may be allowed through the center of the spool from the pressure source to the tank. When one of the coils is energized, the valve member is pushed or pulled to provide fluid flow between the various ports, depending on the particular configuration of the hydraulic circuit.

The spring chamber functions to hold the spool in the center or neutral position in a de-energized state and to return the spool to the center or neutral position after the coils are de-energized. As described above, mechanical or electrical forces applied to the plunger overcome the spring force and shift the spool into a pull or push position. External forces, such as flow forces, produce non-symmetrical loads. However, a conventional three position solenoid cartridge valve includes springs providing symmetrical holding or return forces for the push and pull operation.

The present invention is directed to solving one or more of the problems discussed above, in a novel and simple manner.

SUMMARY OF THE INVENTION

In accordance with the invention, a three position solenoid operated valve is adapted to counteract non-symmetrical flow forces.

There is disclosed in accordance with one aspect of the invention a three position solenoid valve comprising an elongate cylindrical valve housing having an axial through bore defining an interior chamber. A port end of the chamber comprises an end port and a plurality of axially spaced side openings defining a plurality of side ports. An axial opposite end comprises a sleeve end receivable in a solenoid, in use. A valve member is movable in the chamber at the port end between a neutral position and opposite first and second actuated positions for selectively controlling fluid flow between the end port and the side ports. A solenoid plunger is operatively connected to the valve member and is movable in the interior chamber at the sleeve end for positioning the valve member using a pull force or a push force. Biasing means in the valve housing normally maintain the valve member in the neutral position and create a non-symmetrical force pattern for pull and push movement of the valve member.

It is a feature of the invention that the interior chamber comprises a spring chamber and the biasing means comprises first and second springs in the spring chamber.

In accordance with one aspect of the invention, the first spring opposes the push movement and the second spring opposes the pull movement and the springs have different force characteristics.

In accordance with another aspect of the invention, one of the springs opposes one of the push or the pull movement and both of the springs oppose the other of the push or the pull movement. The springs may have different force characteristics.

In accordance with a further aspect of the invention, both of the springs always oppose one of the push or the pull movement and both of the springs oppose the other of the push or the pull movement in stages. The springs may have different force characteristics.

There is disclosed in accordance with a further aspect of the invention, a three position solenoid operated cartridge valve comprising an elongate cylindrical cartridge valve housing having an axial through bore defining an interior chamber. A port end of the chamber comprises an end port and a plurality of axially spaced side openings define a plurality of side ports. An axial opposite end comprises a sleeve end receivable in a solenoid, in use, and a spring chamber intermediate the port end and the sleeve end. A valve member is movable in the chamber at the port end between a neutral position and opposite first and second actuated positions for selectively controlling fluid flow between the end port and the side ports. A solenoid plunger is movable in the sleeve end of the interior chamber. A rod operatively connects the valve member to the solenoid plunger for positioning the valve member responsive to movement of the solenoid plunger using a pull force or a push force. First and second springs in the spring chamber effectively provide a bias force to the valve member for normally maintaining the valve member in the neutral position and for creating a non-symmetrical force pattern for push and pull movement of the valve member.

There is disclosed in accordance with yet another aspect of the invention a three position solenoid valve comprising an elongate cylindrical valve housing having an axial through bore defining an interior chamber. A port end of the chamber comprises an end port and a plurality of axially spaced side openings defining a plurality of side ports. An axial opposite end comprises a sleeve end receivable in a solenoid, in use. A valve member is movable in the chamber at the port end between a neutral position and opposite first and second actuated positions for selectively controlling fluid flow between the end port and the side ports. A solenoid plunger is operatively connected to the valve member and is movable in the interior chamber at the sleeve end for positioning the valve member using a pull force or a push force. Biasing means in the valve housing provide a bias force to the valve member and adapted to counteract non-symmetrical flow forces resulting from pull and push movement of the valve member.

Further features and advantages of the invention will be readily apparent from the specification and from the drawings.

DETAILED DESCRIPTION OF THE INVENTION

Figure 1:
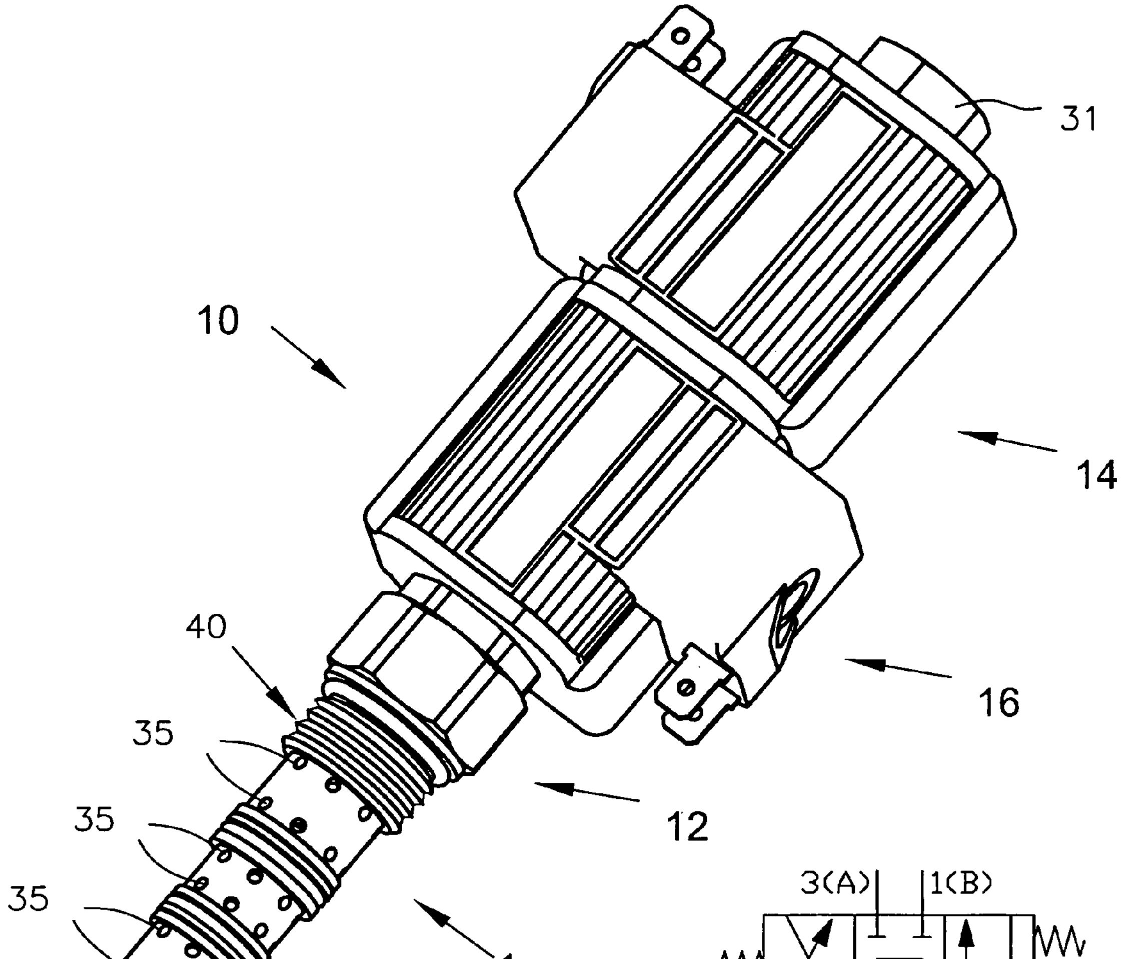
FIG. 1 is a perspective view of a three position solenoid operated cartridge valve in accordance with the invention.

In an illustrated embodiment of the invention, as disclosed in the drawings, a fluid flow control valve generally designated 10 is shown to comprise a three position, four way, tandem center cartridge valve 12 provided with a pair of encapsulated solenoid coils 14 and 16 having opposite magnetic polarity to provide correspondingly opposite forces acting on the cartridge valve 12, as described more particularly below.

Figure 2:
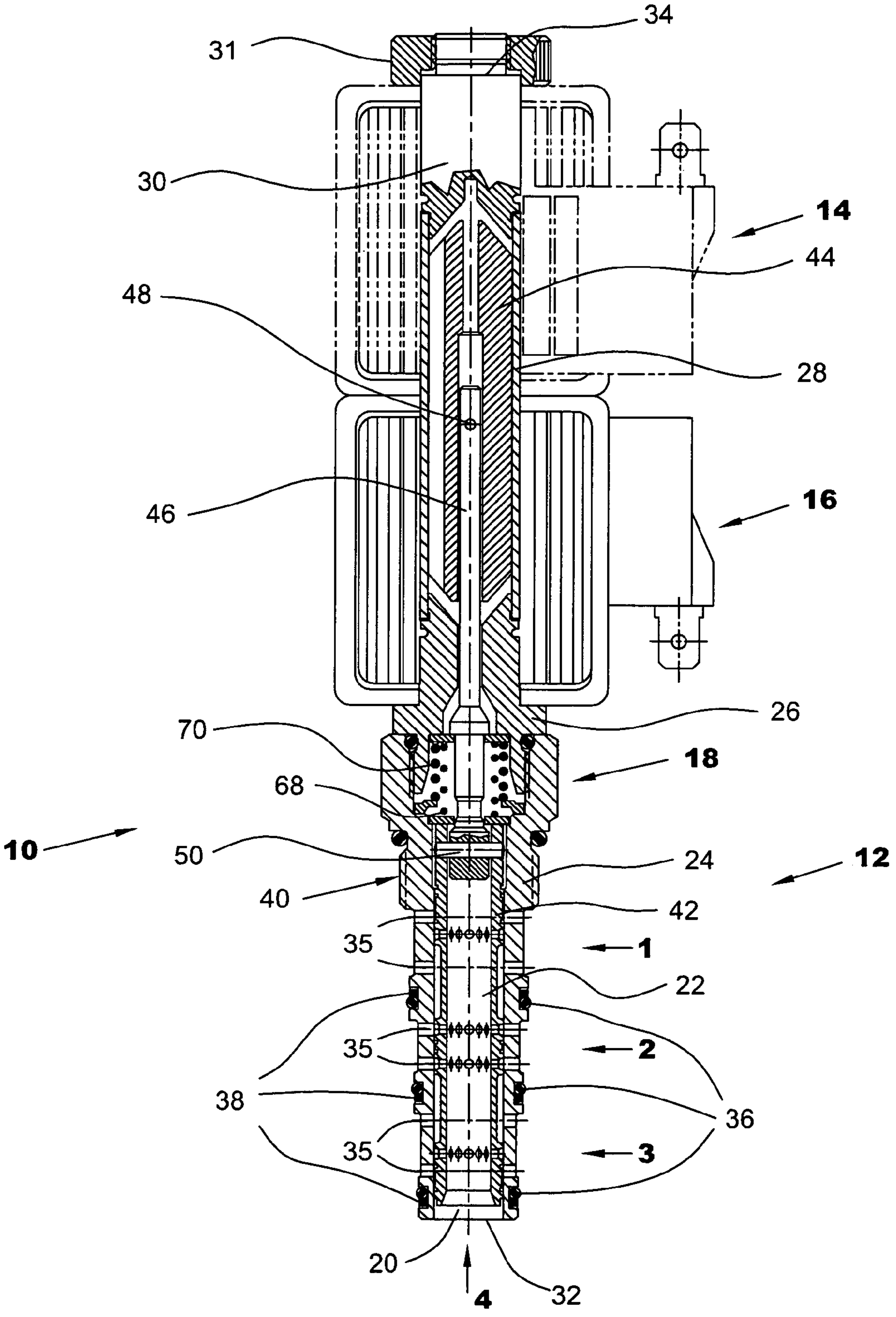
FIG. 2 is a cross-sectional view of the valve of FIG. 1.

With reference also to FIG. 2, the cartridge valve 12 comprises an elongate cylindrical valve housing 18 having a through bore 20 defining an interior chamber 22. Particularly, the valve housing 18 includes a valve body 24 threadably secured to a tube stop adaptor 26 which is in turn connected to a tubular sleeve 28, such as by welding, threading, crimping or brazing. A stop 30 is connected such as by welding, threading, crimping or brazing at the opposite end of the tube 28. A nut 31 threaded to the stop 30 retains the solenoids 14 and 16 on the valve housing 18. The valve housing 18 has a port end 32 and an opposite sleeve end 34. The axial through opening 20 of the port end 32 defines an end port, labeled 4. The valve body 24, as is conventional, includes a plurality of circumferential rows of axially spaced side openings, several of which are labeled with reference numeral 35, defining first, second and third side ports, numbered 1, 2 and 3, respectively. O-rings 36 and back up rings 38 provide a seal between the ports 1, 2, 3 and 4. The valve body is threaded as at 40 to be threaded into a fluid port (not shown).

Figure 3A:
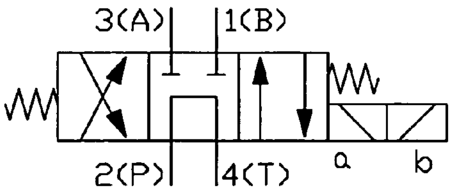
FIG. 3A is a schematic diagram of the valve of FIG. 1 having a tandem center configuration.

A spool or valve member 42 is movable in the interior chamber 22 proximate the port end 32 for selectively controlling fluid flow between the end port 4 and the side ports 1-3. The illustrated spool 42 is operable to provide hydraulic flow as illustrated schematically in FIG. 3A. In this example, port 4 comprises a tank port, port 2 comprises a pressure port and ports 3 and 1 comprise first and second control ports A and B, respectively. The spool 42 is slidably mounted in the valve body 24 for selectively controlling flow of fluid between port 1, 2, 3 and 4 in accordance with the schematic of FIG. 3A. Specifically, the illustrated valve 10 comprises a four-way, three position, tandem center spool valve designed to operate double acting cylinders from pilot circuits and bi-directional motors, etc.

Figure 3B:
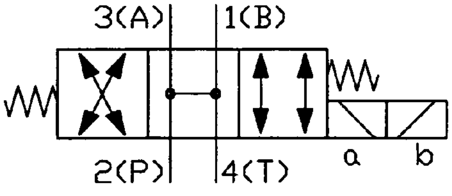
FIG. 3B is a schematic diagram of an alternative valve having an open center configuration.

The particular configuration of the valve 12 is for illustration only. Other types of spool valves such as open center configuration, see FIG. 3B, could also be used.

A plunger or armature 44 is movable in the interior chamber, particularly in the tube 28 proximate the sleeve end 34. The plunger 44 is captured between the tube adaptor 26 and the tube stop 30. A control rod 46 is operatively connected to the plunger 44 using a pin 48 and to the spool 42 using a pin 50. As such, the rod 46 operatively connects the spool 42 to the plunger 44 for positioning the spool 42 responsive to movement of the plunger 44 using a pull force or a push force.

Figure 2A:
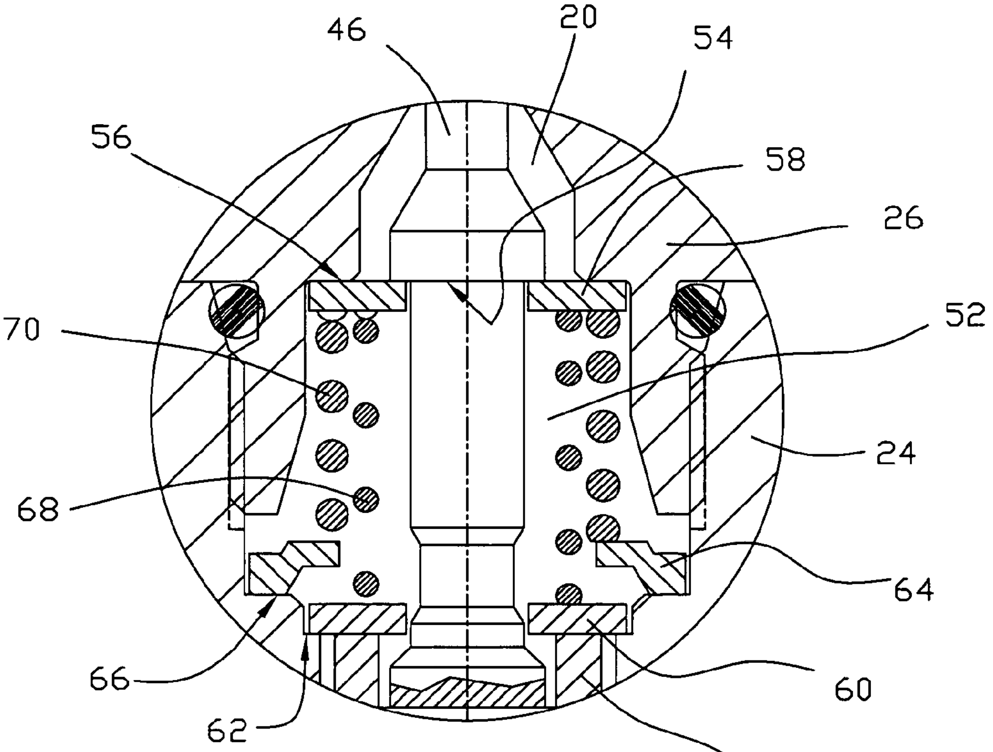
FIG. 2A is an enlarged partial cross-sectional view illustrating a spring chamber of the valve of FIG. 2.

The interior chamber 20 includes a spring chamber 52, see FIG. 2A, intermediate the port end 32 and the sleeve end 34. Particularly, the spring chamber 52 is located where the valve body 24 connects to the tube stop adaptor 26. FIGS. 2 and 2A illustrate the plunger 44 and thus the spool 42 in the neutral, centered position. In this position, the rod 46 includes a shoulder 54 aligned with a shoulder 56 of the tube stop adaptor 26. A first washer or spring guide 58 rests on the shoulders 54 and 56. A second washer or spring guide 60 rests on the spool 42 and a first shoulder 62 of the valve body 24. A third washer or spring guide 64 rests on a second shoulder 66 of the valve body 24, spaced from the spool 42. First and second springs 68 and 70 in the spring chamber 52 effectively provide a bias force to the spool 42 for normally maintaining the spool in the neutral position. The first spring 68 extends between the first and second spring guides 58 and 60. The second spring 70 extends between the first spring guide 58 and the third spring guide 64. The springs 68 and 70 create a non-symmetrical force pattern for push and pull movement of the spool 42 and thus counteract non-symmetrical flow forces, as described more specifically below.

The illustrated valve is often referred to as top loading as the various parts are loaded from the top. The invention can also be used with a bottom loading design, as will be apparent to those skilled in the art.

Figure 4B:
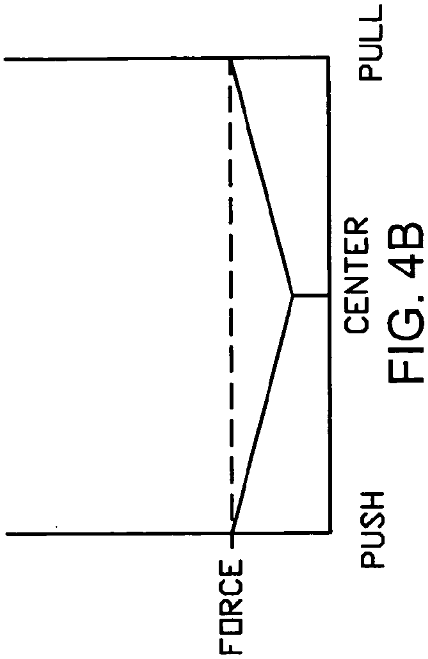
FIG. 4B is a force diagram for the valve of FIG. 4A illustrating symmetrical forces.
Figure 5B:
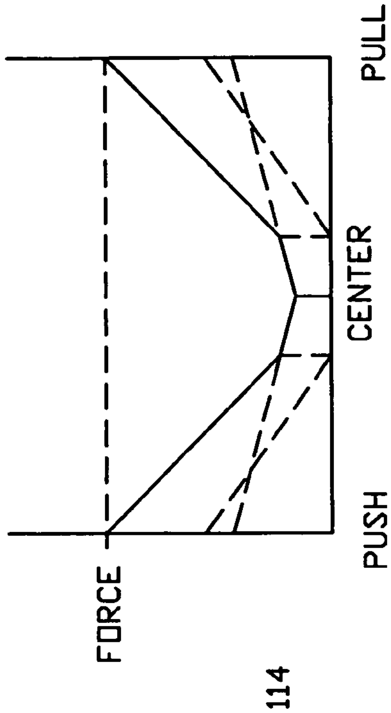
FIG. 5B is a force diagram for the valve of FIG. 5A illustrating symmetrical forces.
Figure 4A:
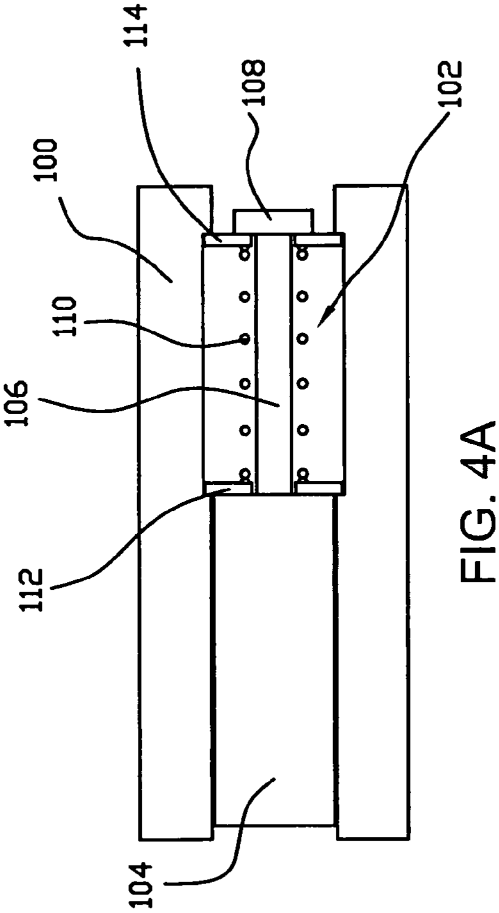
FIG. 4A PRIOR ART
FIG. 4A is a diagrammatic view of a prior art three position solenoid operated valve using a single spring.
Figure 5A:
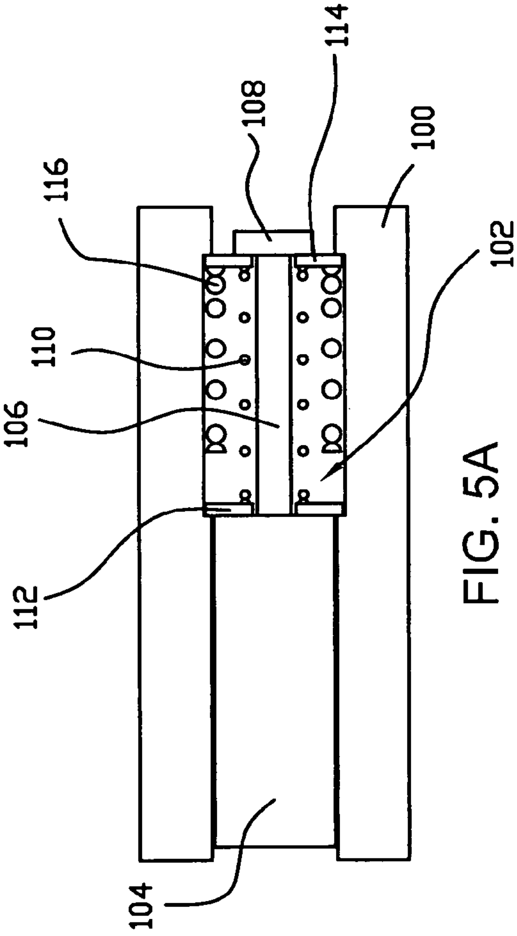
FIG. 5A PRIOR ART
FIG. 5A is a diagrammatic view of a prior art three position solenoid operated valve using two springs.

For a better understanding of the valve operation in accordance with the invention, reference is made to FIGS. 4A and 5A which diagrammatically illustrate prior art valve designs for three position valves. Similarly, FIGS. 6A, 7A, 8A, 9A, 10 and 11 diagrammatically illustrate alternative embodiments of three position valves in accordance with the invention. For simplicity of understanding, common reference numerals are used in each of these figures for generally common components. For example, each includes a valve housing 100 including a spring chamber 102. A spool 104 is movable in the valve housing 100. A rod 106 connects the spool 104 to a plunger 108.

In the prior art embodiment of FIG. 4A, a single spring 110 extends between opposite spring guides 112 and 114. The single spring 110 provides a symmetrical force pattern responsive to push or pull movement of the spool 104 by the plunger 108, as illustrated in FIG. 4B. Although a single spring 110 is illustrated, a second, coaxial spring, could be used providing similar results, albeit a greater spring force.

The embodiment of FIG. 5A differs from that of FIG. 4A by including a second, coaxial spring 116. The second spring 116 has a shorter length than the first spring 110. As such, the springs 110 and 116 provide bias force in stages, as illustrated in FIG. 5B. Again, the force pattern is the same for push or pull movement, resulting in symmetrical force pattern.

In practice, flow forces resulting from the spool being moved responsive to push movement or pull movement results in non-symmetrical flow forces acting on the spool. In accordance with the invention, the spring arrangement is configured to provide non-symmetrical force patterns to counteract such non-symmetrical flow forces.

Figure 6A:
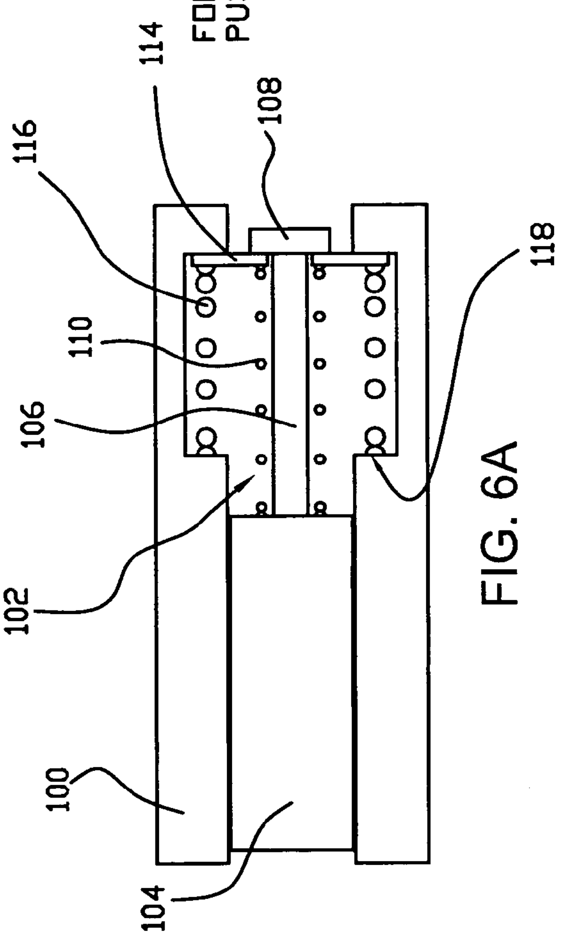
FIG. 6A is a diagrammatic view of a three position solenoid operated valve according to one embodiment of the invention using a pair of springs and a single spring guide.
Figure 6B:
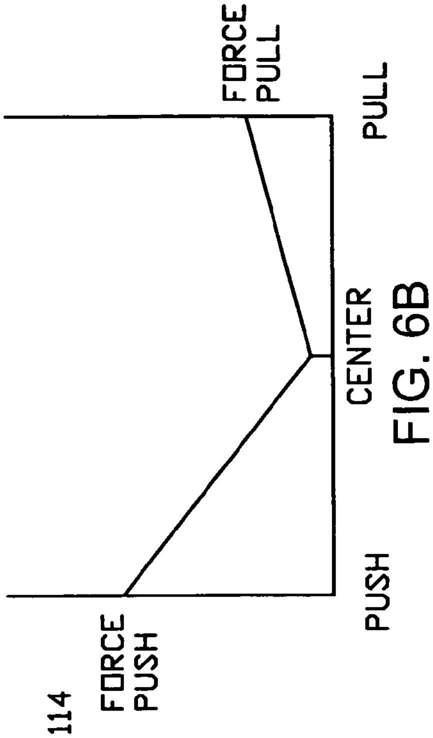
FIG. 6B is a force diagram of the valve of FIG. 6A illustrating non-symmetrical forces.

In a first embodiment of the invention, represented in FIG. 6A, only the second spring guide 114 is used biased against the plunger 108. The first spring 110 is positioned between the spool 104 and the second spring guide 114. The second spring 116 acts between a shoulder 118 and the second spring guide 114. Thus, only the first spring 110 is used for pull movement, while only the second spring 116 is used for push movement, as the first spring 110 moves with the spool 104 during push movement. This provides a non-symmetrical force pattern as illustrated in FIG. 6B. The non-symmetrical force pattern is due to the springs being of different lengths and/or having different force characteristics.

Figure 7A:
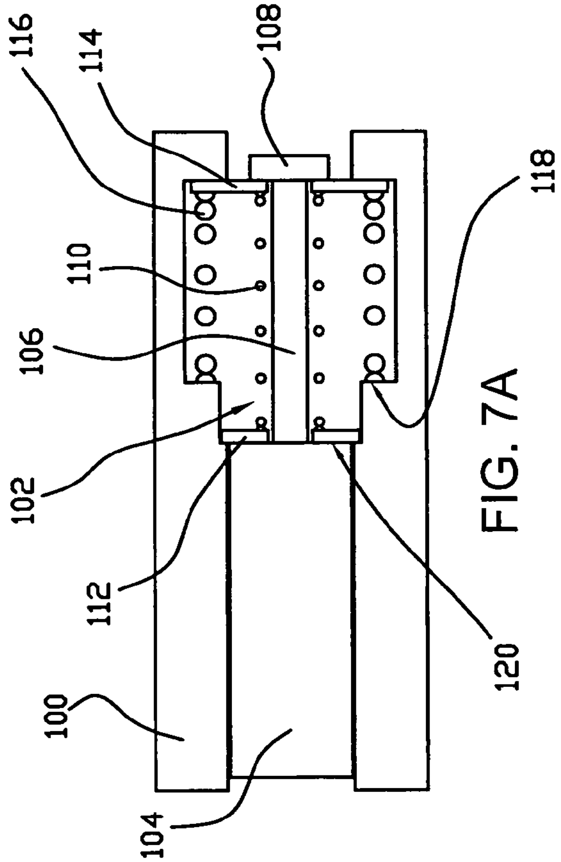
FIG. 7A is a diagrammatic view of a three position solenoid operated valve according to another embodiment of the invention using two springs and two spring guides.
Figure 7B:
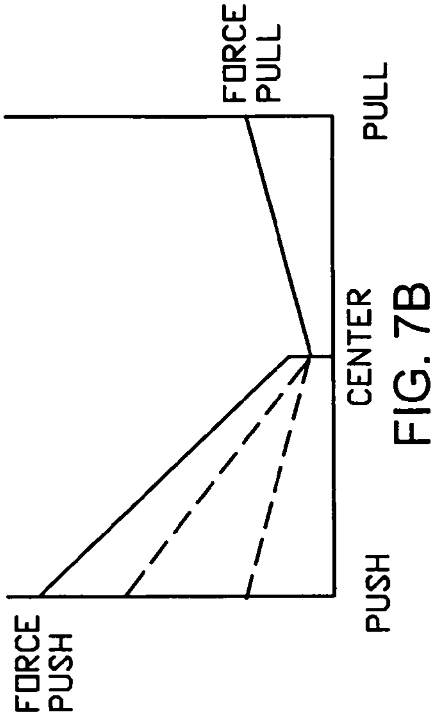
FIG. 7B is a force diagram of the valve of FIG. 7A illustrating a non-symmetrical force pattern.

FIG. 7A is similar to the embodiment of FIG. 6A, except that the first spring guide 112 is included resting on a shoulder 120 aligned with the spool 104. As such, only the first spring 110 is used for pull movement, while both springs 110 and 116 are used for push movement, as illustrated by the non-symmetrical force pattern of FIG. 7B.

Figure 8B:
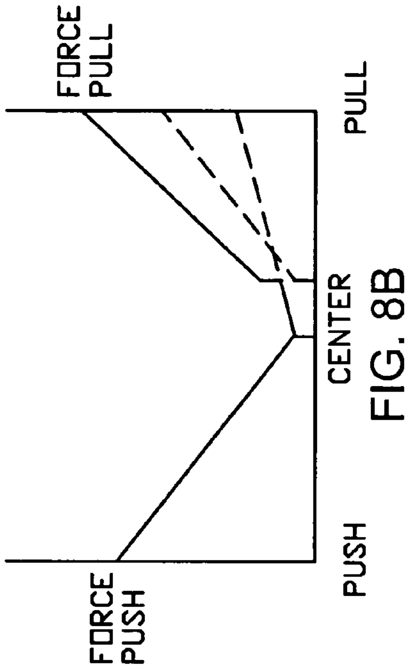
FIG. 8B is a flow diagram of the valve of FIG. 8A illustrating non-symmetrical force pattern.
Figure 8A:
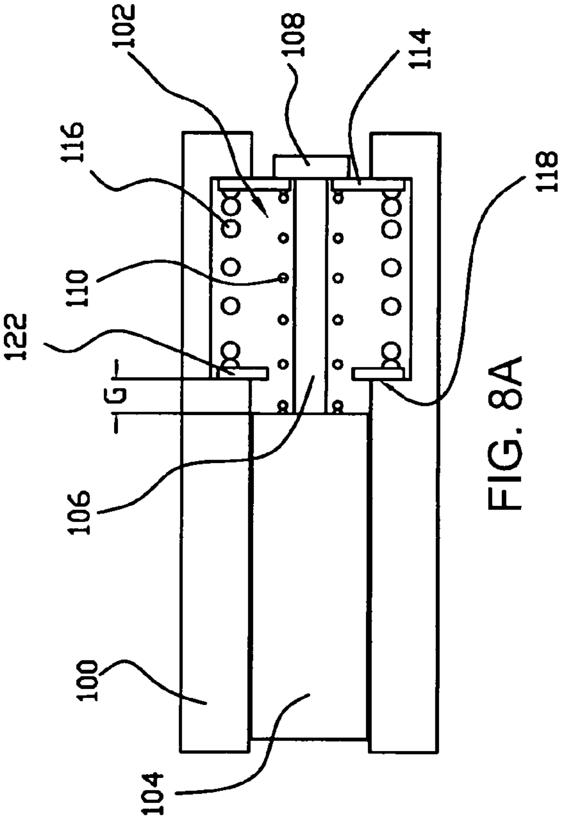
FIG. 8A is a diagrammatic view of a valve in accordance with yet another embodiment of the invention using a pair of springs and two spring guides.

FIG. 8A is similar to the embodiment of FIG. 6A, adding a third spring guide 122 resting on the shoulder 118. The spring guide 122 is sized having an opening smaller than the diameter of the spool 104. In this embodiment, push movement is counteracted by opposing forces from the second spring 116. Pull movement is initially counteracted by only the first spring 110, until the spool 104 moves through a gap G and abuts the third spring guide 122. Thereafter, spring force is provided by both springs 110 and 116 to provide staged opposing forces. FIG. 8B illustrates the non-symmetrical force pattern of the valve of FIG. 8A.

Figure 9B:
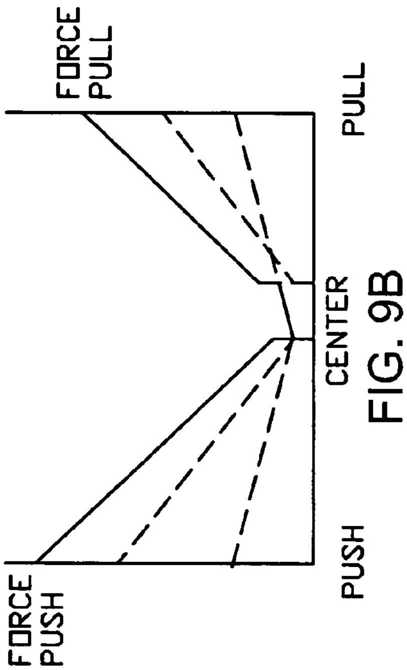
FIG. 9B is a force diagram of the valve of FIG. 9A illustrating a non-symmetrical force pattern.
Figure 9A:
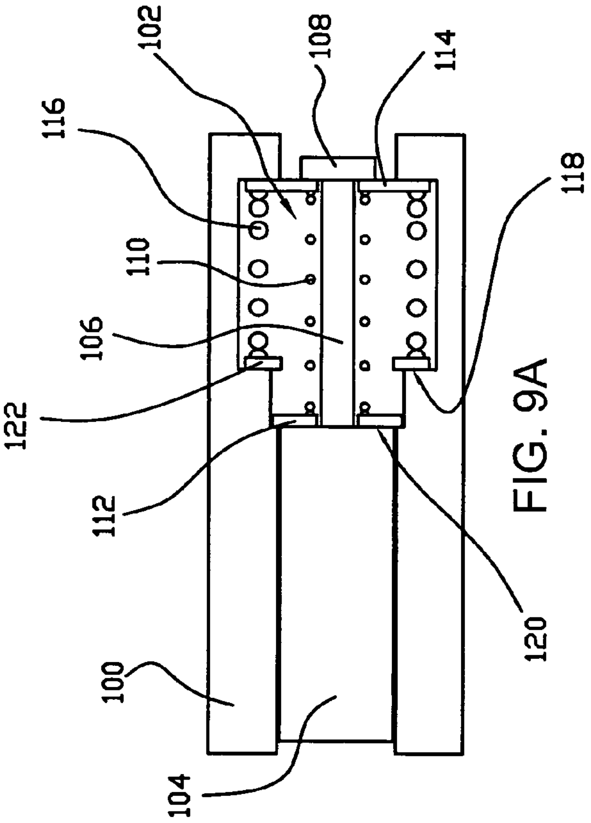
FIG. 9A is a diagrammatic view of a three position solenoid operated valve according to another embodiment of the invention using two springs and three spring guides.

FIG. 9A is similar to the embodiment of FIG. 7A, adding the third spring guide 122 resting on the shoulder 118. The third spring guide 122 is sized having an opening smaller than the diameter of the first spring guide 112. In this embodiment, push movement is counteracted by opposing forces from both springs 110 and 116. Pull movement is initially counteracted by only the first spring 110, until the first spring guide 112 abuts the third spring guide 122. Thereafter, spring force is provided by both springs 110 and 116 to provide staged opposing forces. FIG. 9B illustrates the non-symmetrical force pattern of the valve of FIG. 9A.

Figure 10:
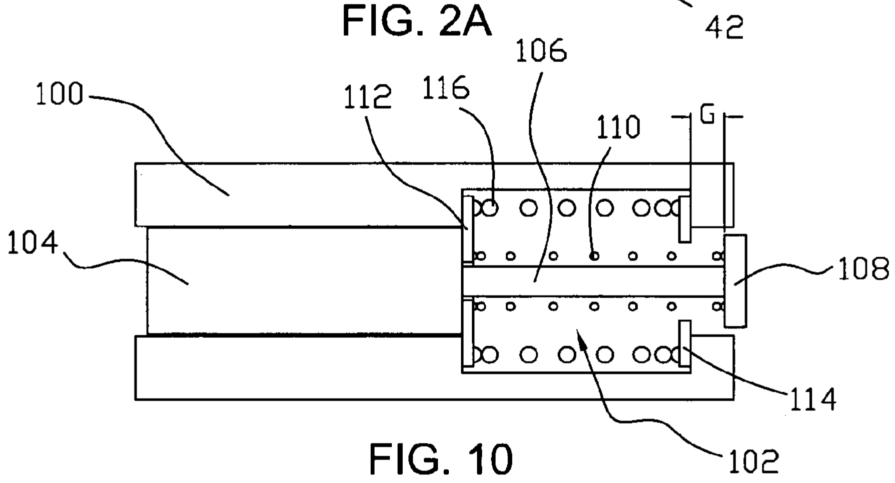
FIG. 10 is a diagrammatic view of a valve in accordance with yet another embodiment of the invention using a pair of springs and two spring guides.
Figure 11:
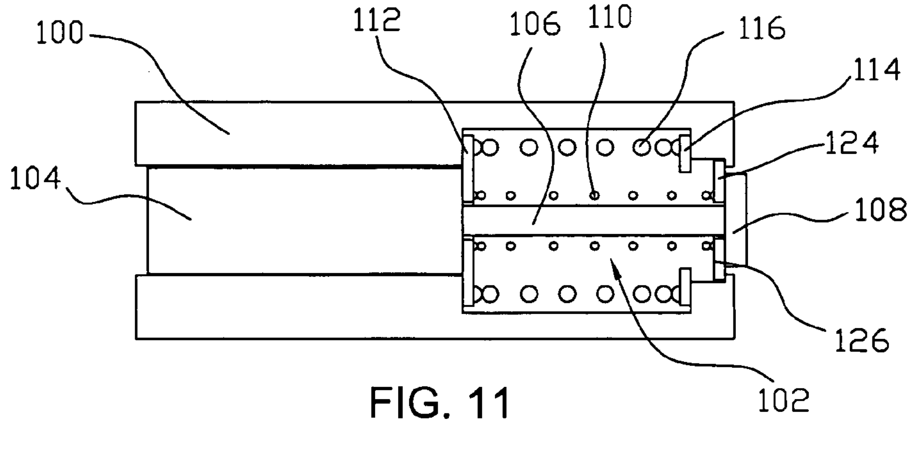
FIG. 11 is a diagrammatic view of a three position solenoid operated valve according to another embodiment of the invention using two springs and three spring guides.

FIGS. 10 and 11 illustrate valve designs having force patterns similar to those provided by the valve designs of FIGS. 8A and 9A, respectively, except that the pull and push operations are reversed.

The valve design of FIG. 10 includes the first and second spring guides 112 and 114. The plunger 108 is spaced a gap G from the second spring guide 114. The second spring guide 114 is sized having an opening smaller than the diameter of the plunger 108. The first spring 110 extends between the plunger 108 and the first spring guide 112. The second spring 116 extends between the spring guides 112 and 114. In this embodiment, pull movement is counteracted by opposing forces from the second spring 116. Push movement is initially counteracted by only the first spring 110, until the plunger 108 moves through the gap G and abuts the second spring guide 114. Thereafter, spring force is provided by both springs 110 and 116 to provide staged opposing forces.

The valve design of FIG. 11 is similar to that of FIG. 10, adding a fourth spring guide 124 resting on a shoulder 126 aligned with the plunger 108. The second spring guide 114 is sized having an opening smaller than the diameter of the fourth spring guide 124. The first spring 110 extends between the fourth spring guide 124 and the first spring guide 112. The second spring 116 extends between the first and second spring guides 112 and 114. In this embodiment, pull movement is counteracted by opposing forces from both springs 110 and 116. Push movement is initially counteracted by only the first spring 110, until the fourth spring guide 124 abuts the second spring guide 114. Thereafter, spring force is provided by both springs 110 and 116 to provide staged opposing forces.

The cartridge valve 12 of FIG. 2 implements the scheme of FIG. 9A with two springs providing opposing force in stages for pull movement. As is apparent, the cartridge valve 12 could use any of the configurations of FIG. 6A, 7A, 8A, 9A, 10 or 11, or other similar alternatives. As described, the non-symmetrical force patterns can be provided by using two springs each having different lengths, materials, sizes or the like to provide different force characteristics according to the particular application for the valve.

Figure 12A:
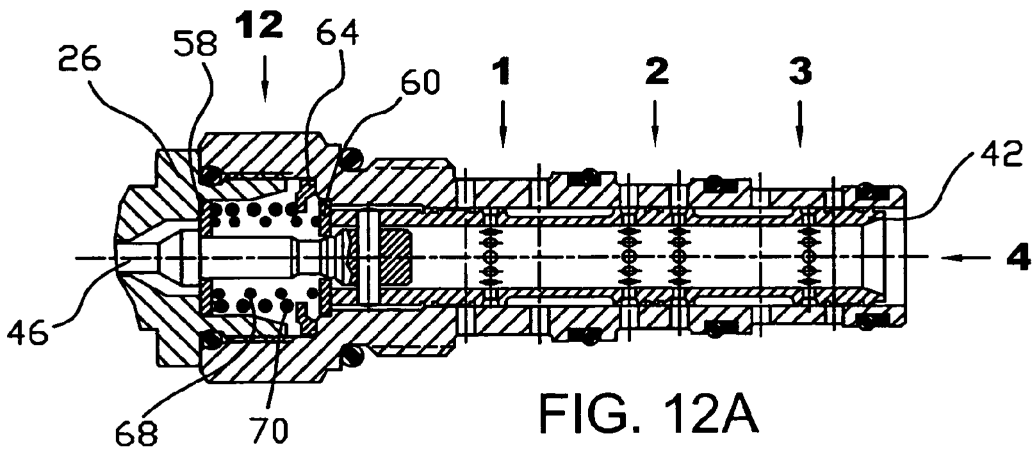
FIGS. 12A, 12B and 12C are detailed cross-sectional views of the valve of FIG. 3 illustrating the valve in the neutral position, push position and pull position, respectively.
Figure 12B:
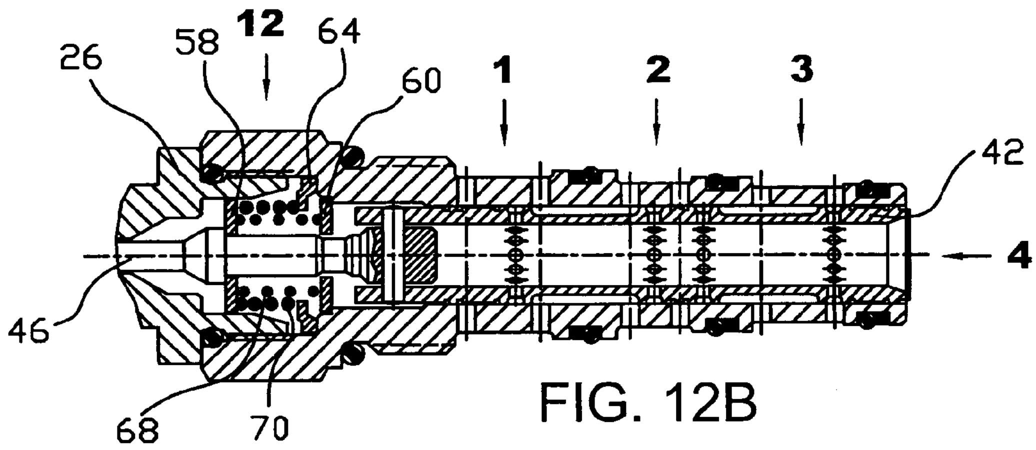
Figure 12C:
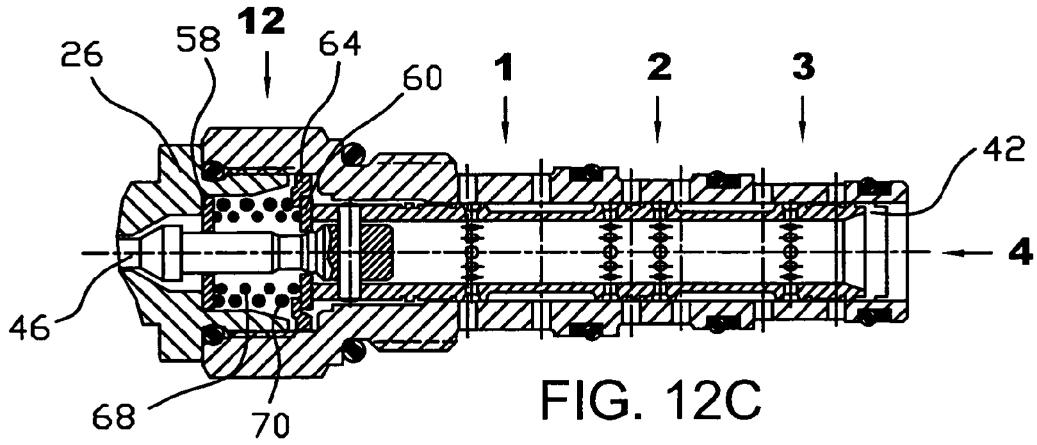

Referring to FIGS. 12A, 12B and 12C, cross-sectional diagrams illustrate the cartridge valve 12 with the spool 42 in the neutral position, push position and pull position, respectively. In FIG. 12A, both solenoid coils 14 and 16 are de-energized and the springs 68 and 70 provide a biasing force between the tube stop adaptor 26 and the spool 42 to maintain the spool 42 in the neutral position. In this position, the supply at port 2 is directly connected to the tank line at port 4. Ports 1 and 3 are shut off. When the second solenoid 16 is energized, it pushes the plunger 44, see FIG. 2, in a direction toward the spool 42 against the force of both springs 68 and 70 to the position shown in FIG. 12B. In the spool push position, the first and second ports are in communication with one another outside of the spool 42 and the third and fourth ports are in communication through the spool 42. Conversely, if the first solenoid 14 is energized, it pulls the plunger 44 away from the valve 42 initially against the force of the first spring 68 and subsequently the second spring 68, as shown in FIG. 12C. This results in staged forces, as discussed above relative to FIGS. 9A and 9B. In this position, the spool 42 is moved to provide fluid communication between port 1 and port 4 and between port 2 and port 3, outside of the spool and through the spool, respectively.

Thus, in accordance with the invention, two springs of different force characteristics and lengths are used, both of which are pre-loaded. During a pushing or pulling operation, both springs are compressed providing a summed rate. During the other of a pulling or pushing operation, the pressure starts with one spring, then when it passes a gap, picks up a second spring.

The described spring chamber arrangement using non-symmetrical forces allows reduction of the required force to operate the valve, allowing reduced solenoid power. Alternatively, this configuration increases the flow valve capacity with a given operational force. In an exemplary embodiment of the invention, a conventional prior art cartridge valve rated for 7 g.p.m. capacity, can be increased to 11 g.p.m. capacity using the spring configuration in accordance with the invention.

Which of the particular configurations are used and the particular spring forces to be used would depend on flow forces to be controlled as well as solenoid forces.

Thus, in accordance with the invention, there is provided a three position solenoid operated cartridge valve creating a non-symmetrical force pattern for pull and push movement of a spool or valve member.

I claim:

1. A three position solenoid operated valve comprising:

an elongate cylindrical valve housing having an axial through bore defining an interior chamber, a port end of said chamber comprising an end port and a plurality of axially spaced side openings defining a plurality of side ports, and an axial opposite end comprising a sleeve end receivable in a solenoid, in use;

a valve member movable in said chamber at the port end between a neutral position and a select distance to opposite first and second actuated positions for selectively controlling fluid flow between said end port and said side ports;

a solenoid plunger operatively connected to the valve member and moveable in said interior chamber at the sleeve end for positioning the valve member using a pull force or a push force; and first and second springs in the valve housing for normally maintaining the valve member in the neutral position and for creating a non-symmetrical force pattern for pull and push movement of the valve member, wherein both of the springs always oppose one of the push or pull movement over the select distance and both of the springs oppose the other of the push or pull movement in stages over the select distance.

2. The three position solenoid operated valve of claim 1 wherein the interior chamber comprises a spring chamber and the first and second springs are in the spring chamber.

3. The three position solenoid operated valve of claim 2 wherein the springs have different force characteristics.

4. The three position solenoid operated valve of claim 1 wherein the springs have different force characteristics.

5. The three position solenoid operated valve of claim 1 wherein both of the springs always oppose one of the push or the pull movement and one of the springs opposes the other of the push or the pull movement over a portion of the select distance and both of the springs oppose the other of the push or pull movement over a remainder of the select distance.

6. The three position solenoid operated valve of claim 5 wherein the springs have different force characteristics.

7. A three position solenoid operated cartridge valve comprising:

an elongate cylindrical cartridge valve housing having an axial through bore defining an interior chamber, a port end of said chamber comprising an end port and a plurality of axially spaced side openings defining a plurality of side ports, an axial opposite end comprising a sleeve end receivable in a solenoid, in use, and a spring chamber intermediate the port end and the sleeve end;

a valve member movable in said chamber at the port end between a neutral position and a select distance to opposite first and second actuated positions for selectively controlling fluid flow between said end port and said side ports;

a solenoid plunger moveable in the sleeve end of the interior chamber;

a rod operatively connecting the valve member to the solenoid plunger for positioning the valve member responsive to movement of the solenoid plunger using a pull force or a push force; and first and second springs in the spring chamber effectively providing a bias force to the valve member for normally maintaining the valve member in the neutral position and for creating a non-symmetrical force pattern for pull and push movement of the valve member, wherein both of the springs always oppose one of the push or pull movement over the select distance and both of the springs oppose the other of the push or pull movement in stages over the select distance.

8. The three position solenoid operated cartridge valve of claim 7 wherein the springs have different force characteristics.

9. The three position solenoid operated cartridge valve of claim 7 wherein both of the springs always oppose one of the push or the pull movement and one of the springs opposes the other of the push or the pull movement over a portion of the select distance and both of the springs oppose the other of the push or pull movement over a remainder of the select distance.

10. The three position solenoid operated cartridge valve of claim 9 wherein the springs have different force characteristics.

11. The three position solenoid operated cartridge valve of claim 7 wherein the valve housing comprises a one-piece housing.

12. The three position solenoid operated cartridge valve of claim 7 further comprising a plurality of spring guides operatively associated with opposite ends of the first and second springs.

13. A three position solenoid operated valve comprising:

an elongate cylindrical valve housing having an axial through bore defining an interior chamber, a port end of said chamber comprising an end port and a plurality of axially spaced side openings defining a plurality of side ports, and an axial opposite end comprising a sleeve end receivable in a solenoid, in use;

a valve member movable in said chamber at the port end between a neutral position and a select distance to opposite first and second actuated positions for selectively controlling fluid flow between said end port and said side ports;

a solenoid plunger operatively connected to the valve member and moveable in said interior chamber at the sleeve end for positioning the valve member using a pull force or a push force; and biasing means in the valve housing for providing a bias force to the valve member and adapted to counteract non-symmetrical flow forces resulting from pull and push movement of the valve member comprising first and second springs, wherein both of the springs always oppose one of the push or pull movement over the select distance and both of the springs oppose the other of the push or pull movement in stages over the select distance.

14. The three position solenoid operated valve of claim 13 wherein the interior chamber comprises a spring chamber and the first and second springs are in the spring chamber and the springs have different force characteristics.

15. The three position solenoid operated valve of claim 13 wherein the interior chamber comprises a spring chamber and the first and second springs are in the spring chamber, wherein both of the springs always oppose one of the push or the pull movement and one of the springs opposes the other of the push or the pull movement over a portion of the select distance and both of the springs oppose the other of the push or pull movement over a remainder of the select distance.

* * * * *